J. T. WATKINS & J. S. SCOTT.
Feeding Devices for Thrashing-Machines.

No. 146,625. Patented Jan. 20, 1874.

Witnesses
John L. Borne
C. Milton Richardson

James T. Watkins
Jasper S. Scott
by Dewey & Co
Attys

UNITED STATES PATENT OFFICE.

JAMES T. WATKINS AND JASPER S. SCOTT, OF SANTA CLARA, CALIFORNIA.

IMPROVEMENT IN FEEDING DEVICES FOR THRASHING-MACHINES.

Specification forming part of Letters Patent No. 146,625, dated January 20, 1874; application filed November 21, 1873.

*To all whom it may concern:*

Be it known that we, JAMES T. WATKINS and JASPER S. SCOTT, both of Santa Clara, county of Santa Clara, State of California, have invented an Automatic Feeder for Thrashers; and we do hereby declare the following description and accompanying drawings are sufficient to enable any person skilled in the art or science to which it most nearly appertains to make and use our said invention.

The object of our invention is to provide an improved device for feeding the unthrashed straw to the cylinders of thrashing-machines or separators. Our improvement consists in the employment of one or more forks, which are so connected with supporting and operating arms that they will, by suitable machinery, be alternately reciprocated back and forth in front of the throat of the machine, so as to feed the straw into the machine by a raking motion.

Figure 1:
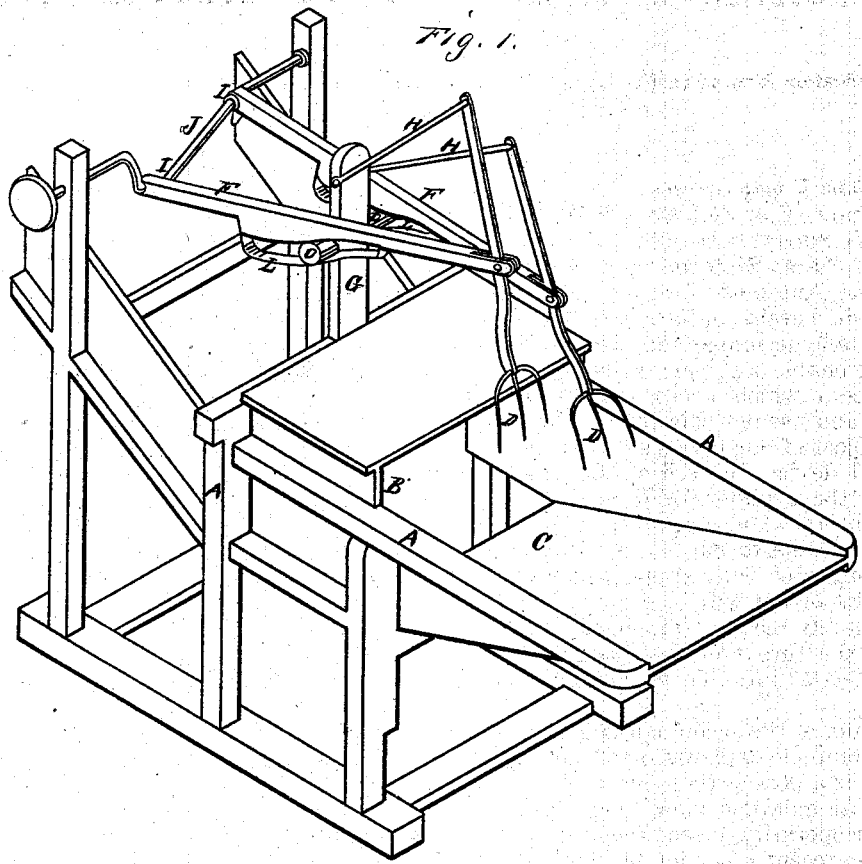
Figure 2:
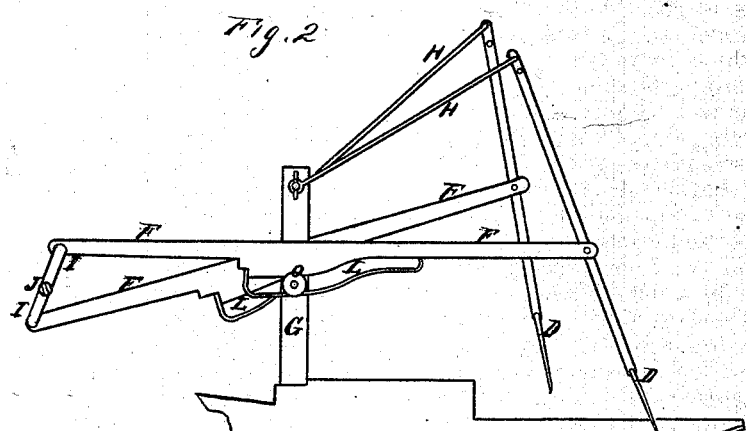

Referring to the accompanying drawings for a more complete explanation of our invention, Figure 1 is a perspective view of our machine. Fig. 2 is an enlarged view, showing the forks and their operating mechanism.

A A represent a portion of the supporting-timbers of a thrashing-machine, within which the cylinder lies, at B. C is the throat of the machine, into which the unthrashed straw is fed, and from which it is taken by the cylinder. This feeding is ordinarily done by hand, and is a very laborious as well as irregular method; sometimes clogging and partially stopping the machine, and sometimes leaving it with too little straw, so that it will run too fast. Our feeder consists of one or more forks, D, of any suitable construction, each of which is operated by an arm, F, from a crank-shaft, J, which is driven by a belt-connection with the machine. G is a short upright post, which I secure upon the top of the machine. One end of each of the arms F is secured to a crank on the crank-shaft, while its middle is provided with a curved slot, L, through which a pin, *i*, passes into the upright post G. A friction-roller, O, may be placed upon the pin to relieve the friction. The forward end of the arm is pivoted to the middle of the fork-handle, while one end of a connecting-rod, H, is secured to the upper end of the handle, its opposite end being secured to the upper end of the post G.

Now, as the crank-shaft J is rotated, the arm F will be moved back and forth, while the curved slot L lifts and lowers its forward end, causing the fork to describe an oval track in front of the mouth of the machine, and thus rake the grain down the incline to the cylinders.

The motion of the rake may be regulated by shifting the point of the attachment of the arms F and rod H up and down along the fork-handle, so as to cause it to describe a larger or smaller oval, according to the requirements of the machine, because the larger the oval described by it the more straw it will feed.

The operation of our feeder will be as follows: The straw being brought to the edge of the throat C of the machine, the latter being in motion, the rotation of the crank-shaft J will carry the forks backward. As they begin to move, the curved slot L, passing over the roller O, will raise the end of the rod H and the fork D, so that it will pass back clear of the mass of straw. The arms H allow the forks to rise and fall, but prevent the handles from moving back. As the fork reaches its farthest backward position, the continued motion of the crank I causes it to drop into the mass of straw, after which it is dragged forward, bringing the straw with it. When two or more forks are employed, they will move so as to feed alternately. The inclined slot L, which raises the fork in its backward movement, also depresses it in the forward movement, so as to keep it close to the bottom of the throat, which is inclined.

Our feeder also acts as a regulator, for the forks are always carried back at a certain height from the bottom of the throat, and if any masses of straw should be brought to them they would force back the overplus, and only take a certain quantity forward.

Any number of feeding-forks can be employed, and they can be mounted in various ways so as to secure the same result. The power required to operate them is very slight, and when it is desired to cease feeding with the forks and feed by hand, the rod *f* can be detached and the forks turned back out of the way. The driving-belt then being thrown off, the feeding apparatus is rendered inoperative, and is entirely out of the way.

Having thus described our invention, what we claim as new, and desire to secure by Letters Patent, is—

A feeding device for thrashers, consisting of the forks D, arms F having the slots L, the rods H with the crank I, and the friction-rollers O, substantially as and for the purpose herein described.

In witness whereof we hereunto set our hands and seals.

JAMES T. WATKINS. [L. S.]
JASPER S. SCOTT. [L. S.]

Witnesses:
 E. W. ASAM,
 D. S. PAYNE.